C. L. COOK.
INTERNAL COMBUSTION ENGINE.
APPLICATION FILED SEPT. 17, 1910.
1,030,806.
Patented June 25, 1912.
2 SHEETS—SHEET 1.
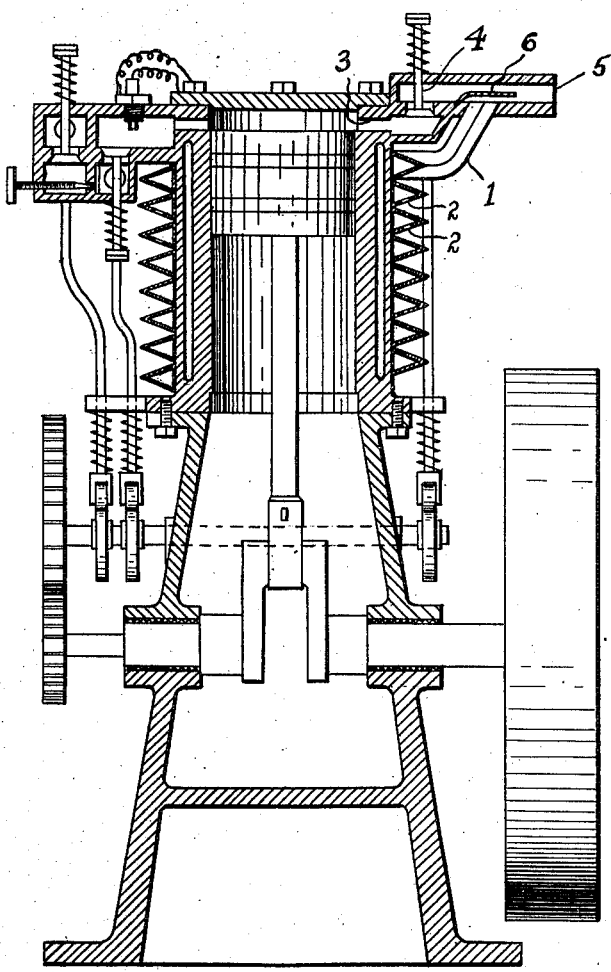
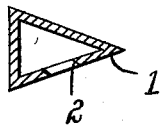
WITNESSES:
Harry W. Davis.
Katherine Arnett.
Charles Lee Cook  INVENTOR.
BY
Popham & Webster ATTORNEYS.